(12) United States Patent
Anderson et al.

(10) Patent No.: US 8,843,269 B2
(45) Date of Patent: Sep. 23, 2014

(54) VEHICLE SOIL PRESSURE MANAGEMENT BASED ON TOPOGRAPHY

(75) Inventors: Noel Wayne Anderson, Fargo, ND (US); Larry Lee Hendrickson, Savoy, IL (US)

(73) Assignee: Deere & Company, Moline, IL (US)

( * ) Notice: Subject to any disclaimer, the term of this patent is extended or adjusted under 35 U.S.C. 154(b) by 197 days.

(21) Appl. No.: 13/212,062

(22) Filed: Aug. 17, 2011

(65) Prior Publication Data

US 2013/0046439 A1 Feb. 21, 2013

(51) Int. Cl.
*G06F 7/00* (2006.01)
*B60C 23/00* (2006.01)

(52) U.S. Cl.
CPC ........... *B60C 23/002* (2013.01); *B60T 2210/36* (2013.01)
USPC ............... 701/36; 701/30; 701/123; 701/412; 152/209.13; 152/415; 152/416; 152/417; 152/454; 73/146; 340/438; 340/443; 172/2; 180/271; 472/117; 474/215; 60/602; 297/217.2; 134/18; 301/5.24; 455/566

(58) Field of Classification Search
USPC ......... 701/30, 36, 123, 412; 152/209.13, 415, 152/416, 417, 454; 73/146; 340/438, 443; 172/2; 180/271; 472/117; 474/215; 60/602; 297/217.2; 134/18; 301/5.24; 455/566
See application file for complete search history.

(56) References Cited

U.S. PATENT DOCUMENTS

| | | | |
|---|---|---|---|
| 3,698,461 A | 10/1972 | Markow | |
| 4,313,483 A * | 2/1982 | Brockmann | 152/416 |
| 4,431,043 A * | 2/1984 | Goodell et al. | 152/417 |
| 4,619,303 A | 10/1986 | Bryan et al. | |
| 5,180,456 A | 1/1993 | Schultz et al. | |
| 5,327,346 A | 7/1994 | Goodell | |
| 5,647,927 A * | 7/1997 | Mason | 152/415 |
| 5,839,801 A | 11/1998 | Ferguson | |
| 5,841,282 A | 11/1998 | Christy et al. | |
| 5,995,895 A | 11/1999 | Watt et al. | |
| 6,064,931 A | 5/2000 | Sawada et al. | |
| 6,098,682 A | 8/2000 | Kis | |
| 6,128,574 A | 10/2000 | Diekhans | |
| 6,129,372 A | 10/2000 | Gallenberg | |
| 6,144,295 A | 11/2000 | Adams et al. | |
| 6,212,464 B1 | 4/2001 | Skotnikov | |

(Continued)

FOREIGN PATENT DOCUMENTS

| | | |
|---|---|---|
| DE | 4201718 C1 | 8/1993 |
| EP | 2267566 | 12/2010 |
| WO | WO2011063814 | 6/2011 |

OTHER PUBLICATIONS

PCT International Search Report and Written Opinion of the International Searching Authority, PCT/US2012/051106, Nov. 8, 2012 (7 pages).

(Continued)

*Primary Examiner* — James Trammell
*Assistant Examiner* — Sanjeev Malhotra
(74) *Attorney, Agent, or Firm* — Yee & Associates, P.C.

(57) ABSTRACT

Systems and techniques are provided for managing an interface between a machine or work vehicle and a surface that the machine/work vehicle travels on in order to provide an optimum work performance level that balances fuel efficiency and surface adversity. Fleet management and reporting capabilities pertaining to such interface management are also provided.

16 Claims, 6 Drawing Sheets

(56) References Cited

U.S. PATENT DOCUMENTS

| | | | |
|---|---|---|---|
| 6,389,999 | B1 | 5/2002 | Duello |
| 6,763,288 | B2 | 7/2004 | Caretta et al. |
| 6,779,618 | B2 | 8/2004 | Tarasinski |
| 6,868,719 | B1 | 3/2005 | Claussen et al. |
| 6,898,501 | B2 | 5/2005 | Schubert |
| 6,934,615 | B2 | 8/2005 | Flann et al. |
| 7,070,247 | B2 | 7/2006 | Offerle |
| 7,079,943 | B2 | 7/2006 | Flann et al. |
| 7,110,881 | B2 | 9/2006 | Gray et al. |
| 7,231,295 | B2 | 6/2007 | Pickett et al. |
| 7,292,924 | B2 | 11/2007 | Milot |
| 7,302,837 | B2 | 12/2007 | Wendte |
| 7,415,333 | B2 | 8/2008 | Anderson |
| 7,505,848 | B2 | 3/2009 | Flann et al. |
| 7,677,095 | B1 | 3/2010 | Bartol |
| 7,979,203 | B2 * | 7/2011 | Haag et al. ............... 701/412 |
| 8,145,402 | B2 | 3/2012 | Craig |
| 8,170,792 | B2 | 5/2012 | Mizuno et al. |
| 8,176,958 | B2 | 5/2012 | Rodenbeck |
| 8,244,442 | B2 | 8/2012 | Craig et al. |
| 2001/0052259 | A1* | 12/2001 | Mahner ................... 73/146 |
| 2002/0121323 | A1* | 9/2002 | Tarasinski ................ 152/416 |
| 2002/0131046 | A1 | 9/2002 | Christy et al. |
| 2002/0158756 | A1* | 10/2002 | Martin .................... 340/443 |
| 2003/0005759 | A1* | 1/2003 | Breed et al. ............... 73/146 |
| 2003/0040827 | A1 | 2/2003 | Chernoff et al. |
| 2003/0069684 | A1* | 4/2003 | Reimer ................... 701/123 |
| 2003/0121674 | A1* | 7/2003 | Scarlett et al. ............. 172/2 |
| 2004/0016486 | A1 | 1/2004 | Tropper |
| 2005/0102073 | A1 | 5/2005 | Ingram |
| 2005/0279160 | A1* | 12/2005 | Nordhoff ................. 73/146 |
| 2006/0027412 | A1* | 2/2006 | Geborek ................. 180/271 |
| 2006/0217993 | A1 | 9/2006 | Anderson |
| 2007/0060403 | A1* | 3/2007 | Henry et al. .............. 472/117 |
| 2007/0068238 | A1 | 3/2007 | Wendte |
| 2007/0087882 | A1* | 4/2007 | Vornehm et al. .......... 474/215 |
| 2007/0105676 | A1* | 5/2007 | Vietoris .................. 474/215 |
| 2007/0144171 | A1* | 6/2007 | Tarasinski et al. ......... 60/602 |
| 2007/0239472 | A1 | 10/2007 | Anderson |
| 2007/0288167 | A1 | 12/2007 | Anderson et al. |
| 2008/0036252 | A1* | 2/2008 | Breed .................... 297/217.2 |
| 2008/0202777 | A1 | 8/2008 | Corcoran |
| 2008/0284118 | A1 | 11/2008 | Venton-Walters et al. |
| 2009/0079839 | A1 | 3/2009 | Fischer et al. |
| 2009/0084478 | A1* | 4/2009 | Wallet et al. ............. 152/209.13 |
| 2009/0093928 | A1 | 4/2009 | Getman et al. |
| 2009/0143936 | A1 | 6/2009 | Craig |
| 2009/0173147 | A1 | 7/2009 | Sandomirsky et al. |
| 2009/0210111 | A1* | 8/2009 | Laermer et al. ............ 701/30 |
| 2009/0211605 | A1* | 8/2009 | Ahmad .................... 134/18 |
| 2009/0259483 | A1 | 10/2009 | Hendrickson et al. |
| 2009/0292426 | A1 | 11/2009 | Nelson et al. |
| 2010/0023213 | A1 | 1/2010 | Mizuno et al. |
| 2010/0037712 | A1 | 2/2010 | Burton |
| 2010/0071453 | A1 | 3/2010 | Isono |
| 2010/0077848 | A1 | 4/2010 | Ulicny et al. |
| 2010/0089602 | A1 | 4/2010 | Tanner |
| 2010/0138142 | A1* | 6/2010 | Pease ..................... 701/123 |
| 2010/0191403 | A1 | 7/2010 | Krause |
| 2010/0211277 | A1 | 8/2010 | Craig et al. |
| 2010/0274447 | A1* | 10/2010 | Stumpf .................... 701/36 |
| 2010/0288411 | A1 | 11/2010 | Loewe |
| 2010/0314015 | A1 | 12/2010 | Rodenbeck |
| 2011/0035105 | A1 | 2/2011 | Jolly |
| 2011/0036475 | A1* | 2/2011 | Kojima et al. ............. 152/454 |
| 2011/0109448 | A1* | 5/2011 | Browne et al. ............ 340/438 |
| 2011/0221261 | A1* | 9/2011 | Eaton et al. .............. 301/5.24 |
| 2012/0034954 | A1* | 2/2012 | Tabe ...................... 455/566 |
| 2012/0323452 | A1 | 12/2012 | Green et al. |
| 2013/0046418 | A1 | 2/2013 | Anderson |
| 2013/0046419 | A1 | 2/2013 | Anderson et al. |
| 2013/0046446 | A1 | 2/2013 | Anderson |
| 2013/0054078 | A1 | 2/2013 | Anderson |

OTHER PUBLICATIONS

PCT International Search Report and Written Opinion of the International Searching Authority, PCT/US2012/051116, Dec. 20, 2012 (8 pages).

PCT International Search Report and Written Opinion of the International Searching Authority, PCT/US2012/051146, Oct. 23, 2012 (9 pages).

The International Search Report and the Written Opinion of the International Searching Authority, Nov. 14, 2012 (8 pages).

"Improved System and Method for Controlling Agricultural Vehicle Operation Using Historical Data," IPCOM000191115D, Dec. 2009, pp. 1-4, accessed Jun. 2, 2011 http://priorartdatabse.com/IPCOM/000191115 (Abstract Only).

PCT International Search Report and Written Opinion of the International Searching Authority, PCT/US12/51138, May 3, 2013, 8 pages.

* cited by examiner

VEHICLE SOIL PRESSURE MANAGEMENT BASED ON TOPOGRAPHY

CROSS REFERENCE TO RELATED APPLICATIONS

This application is related to commonly assigned and co-pending U.S. patent application Ser. No. 13/212,071 entitled "Improving Vehicle Stability and Traction through V-Foot Shape Change"; U.S. patent application Ser. No. 13/212,093 entitled "Dynamic Traction Adjustment"; U.S. patent application Ser. No. 13/212,096 entitled "V-Foot Tire Management at Fleet Level"; and U.S. patent application Ser. No. 13/212,104 entitled "Soil Compaction Management and Reporting" all of which are hereby incorporated by reference.

FIELD OF THE INVENTION

The present invention relates generally to techniques for managing an interface between a machine or work vehicle and a surface that the machine/work vehicle travels on in order to provide an optimum work performance level that balances fuel efficiency and surface adversity.

BACKGROUND OF THE INVENTION

Tire pressure affects vehicle traction (slip) and ride smoothness, tire traction impacts vehicle stability control (e.g., braking), weight distribution affects an area of soil/tire contact, and tire pressure has agronomic impact (e.g., crop yield reduction).

Vehicle traction and stability may be improved in some situations with a greater area of contact between a vehicle and the ground surface. Greater contact may also reduce resultant soil compaction; however, this greater contact may result in decreased fuel efficiency.

Fuel efficiency is increased when rolling friction of a machine is minimized while keeping wheel slip below a certain level. For example, optimal fuel efficiency may be obtained when vehicle tires have relatively high pressure while minimizing wheel slippage. Wet field conditions can cause wheels to slip under high traction load, and thus there is a fuel efficiency benefit to decreasing the tire pressure to reduce wheel slip. However, increased soil compaction, which is detrimental to crops, can occur when the soil is wet and the vehicle tire pressure is high.

Unnecessary compaction of a growth medium such as soil is generally undesirable since it can adversely affect the growing performance of plants. Compaction can occur when growth medium particles are compressed together, which limits the space between such particles for water and air. Soil compaction can also inhibit the growth and development of roots, leading to decreased plant vigor. While some forms of compaction are virtually unavoidable due to causes beyond human control such as heavy rain, it would be desirable to mitigate other types of compaction that are human-caused, such as compaction caused by vehicles used to process materials in a field, forest or worksite such as a construction worksite. U.S. Pat. No. 7,302,837, which is hereby incorporated by reference as background material, attempts to mitigate compaction caused by an implement using soil characteristics and the load of the implement.

What is needed is a mechanism to control the pressure at an interface between a machine and a surface the machine is on in a way which optimizes fuel efficiency while minimizing soil/crop damage.

SUMMARY

An embodiment of the present invention provides a technique to mitigate compaction of a growth medium such as soil or other type of surface, with an additional benefit of optimizing fuel consumption of a vehicle. Vehicle mass data and landscape position are used to adjust parameters associated with elements of the vehicle that contact a surface such as the ground, such elements also being referred to herein as virtual feet or v-feet. A virtual foot, or v-foot, encompasses a part of a vehicle or mobile machine which makes contact with the ground for tractive effort and support, and includes without limitation wheels, tracks, track wheels, inflatable tires, tires with shape adjustment using magneto-rheological or electro-rheological materials, wheels which change footprint by getting wider or narrower, vehicles in which wheels may be raised or lowered to change vehicle footprint, legs, etc.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

A vehicle travelling across a surface or working at a stationary location, such as a farm machine working in a field, construction equipment at a worksite, or forestry equipment in a forest, invariably compacts the surface due to the mass of the vehicle extorting a downward force that limits the space between particles in a growth medium for water and air, similar to squeezing a slice of bread (for relatively wet soil) or a sponge (for relatively dry soil). For example, once a slice of bread is squished, it only bounces back a little. The wetter the soil, the more it acts like bread with the air pockets becoming collapsed for a long time. Dry soil is like a dry sponge since it does not compress much air out, but the material itself bears force of the compaction. Various operating characteristics dictate the amount of such compaction, such as characteristics of the vehicle and characteristics of the surface upon which the vehicle is travelling or sitting. For example, representative types of vehicle characteristics include the weight and shape of the vehicle, and the shape and rigidity of the wheel, tire, track or other surface interface. Representative types of surface characteristics include soil density, moisture content, and slope. The following techniques provide mitigation of such compaction by sensing/monitoring and controlling various operating characteristics of a work environment.

In particular, a technique is provided for controlling and tracking an interface between a vehicle or working machine and a surface that the vehicle/machine travels or sits on, such as a ground surface. In one embodiment, a given operating point for the vehicle/machine, such as the pressure of the vehicle against the surface, is chosen based on various operating parameters such as soil density, moisture content, and slope in order to achieve an optimum performance level with respect to fuel efficiency and soil compaction.

Referring now to the figures wherein like reference numerals correspond to similar elements throughout the several views and, more specifically, referring to FIG. 1, the present invention will be described in the context of self-propelled work vehicle 100 travelling along surface 132, such as a dirt field or similar growing medium pulling agricultural implement 126, with such implement being an optional component that is not necessarily required since the techniques described herein are generally applicable to a stand-alone work vehicle without such implement. Work vehicle or prime mover 100 includes, among other components, processor 112 (including embedded or associated memory containing instructions that are executable by the processor), ground pressure controller 114, location sensor 116, topographical geographical information system (GIS) database 118, tires 120, soil characteristic sensor 122, speed sensor 123 and vehicle load characteristic determiner 124. The optional implement 126 has tire(s) 128 and implement load characteristic determiner(s) 130. In one embodiment, such load characteristic determiner includes a wireless transceiver (not shown) such that load data can be wirelessly transmitted to processor 112 for subsequent processing.

Figure 1:
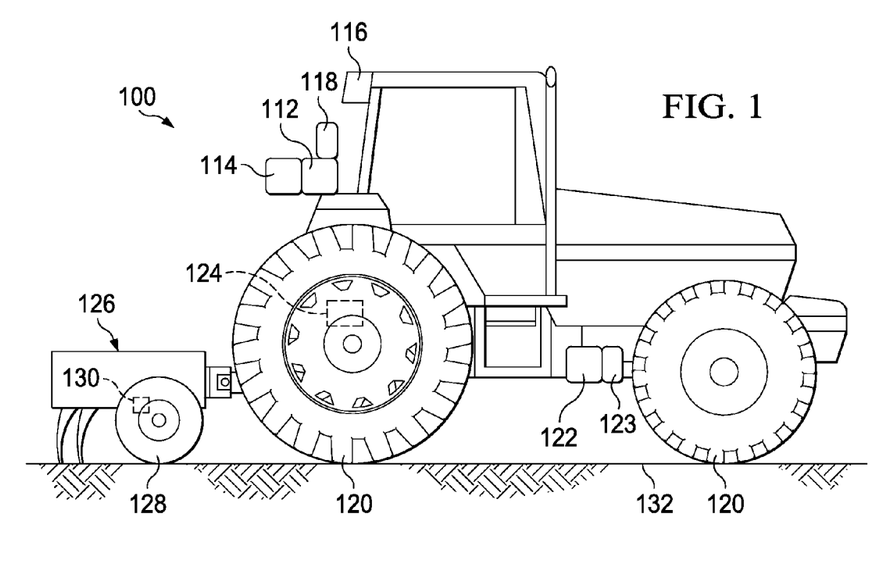
FIG. 1 is a representative vehicle or work machine in which an illustrative embodiment may be implemented.

As shown in FIG. 1, processor 112 is coupled to work vehicle 100. An existing processor coupled to the work vehicle and provided for other purposes can operate as a processor for the compaction mitigation system, or a separate processor may be used. Where a separate processor is provided, the separate processor may be mounted to either work vehicle 100 or implement 126. The processor may share data and commands using a wired or wireless data communications means. Likewise, ground pressure controller 114, location sensor 116, database 118, and/or speed sensor 123 may be mounted to either work vehicle 100 or implement 126.

Figure 2:
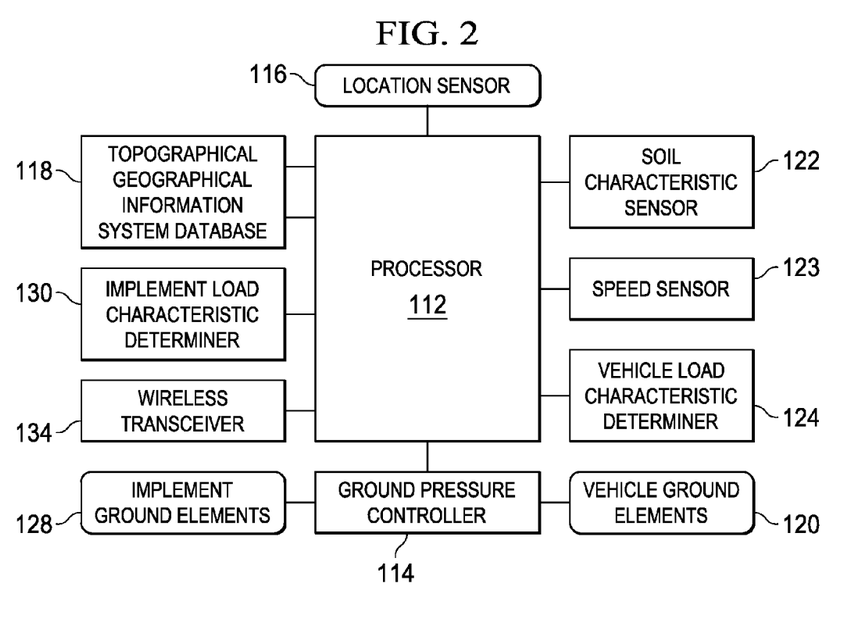
FIG. 2 is a representative diagram of a control circuit in accordance with an illustrative embodiment.

Referring to FIG. 2, processor 112 is connected to and able to communicate with ground pressure controller 114, location sensor 116, topographical geographical information system database 118, soil characteristic sensor 122, speed sensor 123, vehicle load characteristic determiner 124 and wirelessly received load data that is received from agricultural implement load characteristic determiner(s) 130 via wireless transceiver 134. In one embodiment, ground pressure controller 114 controls a compressor (not illustrated) and a valve (not illustrated) for increasing tire pressure and letting air out of the vehicle tires to deflate the tires, respectively, for controlling pressure therein. The compressor/valve link between ground pressure controller 114 and the tires is shown in FIG. 2 by a line linking ground pressure controller 114 to vehicle ground elements 128 and 120.

Vehicle ground elements may include tires, tracks, spheres or any element which serves a similar role in a vehicle, all of which are referred to herein as v-feet. The elements may be adjusted by changing a gas pressure, changing a magneto-rheological or electro-rheological fluid, changing a circular wheel into a generally triangular track (similar to a Galileo wheel, as developed by Galileo Mobility Instruments Ltd. of Lod, Israel), changing the ground-contacting elements width (similar to Valtra Ants, as developed by Valtra Oy Ab of Suolahti, Finland), changing the number of elements in contact with the ground, etc.

Accordingly, in another embodiment, the ground pressure at the interface between work vehicle 100 and surface 132 (as depicted in FIG. 1) is modified by shape adjustment and/or rigidity of the v-feet using magneto-rheological or electro-rheological materials in cooperation with ground pressure controller 114. It is also possible to use ground pressure controller 114 to change the ground pressure at the interface by adjusting air pressure of the v-feet, making the v-feet wider or narrower, or raising or lowering certain ones of multiple wheels or legs (not shown) to change the vehicle's footprint.

Database 118 can contain one or more types of landscape position zones for a field through which a vehicle is to be moved. For example, database 118 may contain data about four different types of zones including a summit zone for higher convex areas, a side-slope zone for areas having steeper slopes, a concave footslope zone below the sideslopes, and a concave toeslope or depressional zone for areas below the footslope.

Figure 3:
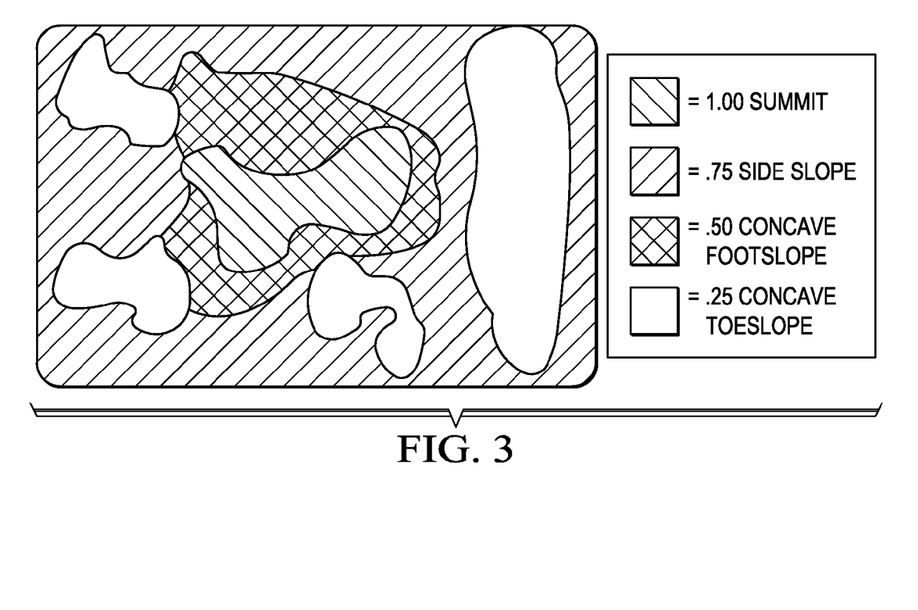
FIG. 3 is a representative exemplary field landscape position zone map in accordance with an illustrative embodiment.

Referring to FIG. 3, an exemplary field landscape position zone map is illustrated that indicates separate zones within a field that have different topographic characteristics. A landscape position zone key is provided below the map that indicates relative topology characteristics. Here, optimal ground pressure is assumed to be related to topology characteristics within the field. Each zone may have a relative tire pressure or tire pressure percentage associated with it. For example, the 1.00 summit region may correspond to 24 pounds/square inch (psi), the 0.75 side-slope region may correspond to 18 psi, the 0.50 concave footslope region may correspond to 12 psi, and the 0.25 concave toeslope region may correspond to 6 psi. Alternatively, or in addition, each zone may have particular v-foot shape/size characteristics that are usable to adjust the v-foot shape/size characteristics.

In one embodiment, these values are initially established by an operator during an initial pass of a given work area for each respective zone. The optimal pressure will depend on the soil moisture. The wetter the soil, the more susceptible it is to compaction damage. When soils are dry, the tires may be kept at a higher pressure without causing excessive damage. On the other hand, the wetter the soil, the more susceptible it is to compaction damage and the greater the need for v-feet to have reduced pressure on the soil. The values are saved and then used for the same or similar zones in other work areas.

In at least some inventive embodiments, during operation, processor 112 determines the location of work vehicle 100 by receiving location signals from location sensor 116 and accessing database 118 to determine a landscape position zone and then uses such landscape position zone along with the tire pressure associated for each zone and perhaps other information, such as detected soil characteristics such as soil moisture, density, etc., to identify an optimal ground pressure level for the vehicle/surface interface.

Figure 4:
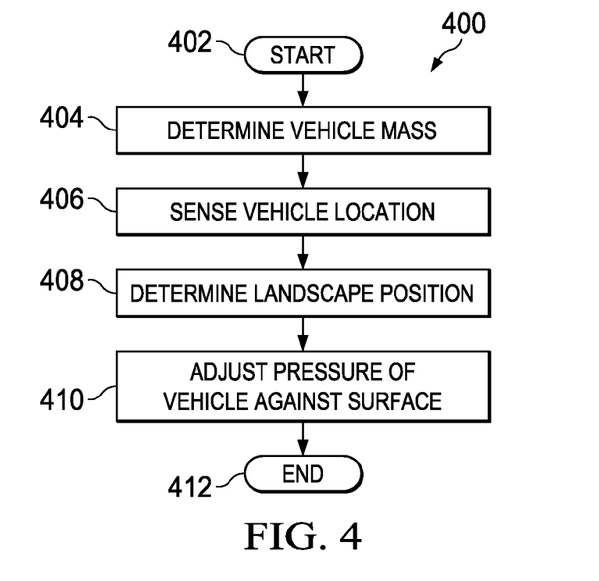
FIG. 4 is a representative process flow for managing the pressure of a vehicle against a surface in accordance with an illustrative embodiment.

Turning now to FIG. 4, there is depicted at 400 a process flow for managing the pressure of a vehicle against a surface, such as the ground that the vehicle is travelling or sitting on (such as when temporarily working at a stationary location for digging, cutting, etc). Other types of surfaces besides the ground include dirt, ice, snow and a paved or hard surface. The process starts at 402 and proceeds to 404 where the mass of the vehicle is determined (i) as an estimate, (ii) as a valued obtained from vehicle load characteristic determiner 124 and/or agricultural implement load characteristic determiner(s) 130, (iii) from a remote source that is received over a wireless network, or (iv) by any other mass-determination means including but not limited to using a fixed value, using a sensed value, adding a sensed value to a fixed value such as adding a sensed amount of weight in a vehicle material storage tank to the fixed weight of such vehicle, and a value calculated from a volume measurement such as a liquid or material volume measurement. Estimates could also be based on determined path and stored material utilization. For example, if an initial weight of grain/seed/fertilizer in a combine tank is known, after application at a given rate along a determined path, the remaining weight of grain/seed/fertilizer could be determined. Similarly, if an initial weight of paving material in a dump truck is known, after application at a given rate along a specified path, the remaining weight of the paving material in the truck could be determined.

At step 406, the location of work vehicle 100 is then sensed or determined by processor 112 receiving location signals from location sensor 116. The topographic GIS database is then accessed by processor 112 at step 408, where the location of the vehicle is used to determine the vehicle's position with respect to the landscape in order to determine a given landscape position zone such as is depicted in FIG. 3. As but one example, the sensed vehicle location of step 406 serves as an index into a landscape position zone map for a given work area. As previously described, each zone may have a relative tire pressure or tire pressure percentage associated with it. For example, the 1.00 summit region may correspond to 24 pounds/square inch (psi), the 0.75 side-slope region may correspond to 18 psi, the 0.50 concave footslope region may correspond to 12 psi, and the 0.25 concave toeslope region may correspond to 6 psi. Alternatively, or in addition, each zone may have particular v-foot shape/size characteristics that are usable to adjust the v-foot shape/size characteristics.

A corresponding adjustment associated with such given zone is then used by ground pressure controller 114, as directed by processor 112, to adjust at step 410 the pressure of the vehicle against the ground surface, such as a particular tire pressure for the v-feet, the number of v-feet elements (such as wheels, tracks, feet or legs) in contact with the surface, changing the shape and/or rigidity of the v-feet in contact with the surface, etc. as previously described. Processing then ends at 412.

In at least some cases, a given landscape position zone will have already been used to identify control signals for the ground pressure controller and the control signals will have been stored in the database for subsequent use. Thus, for instance, optimal ground pressure values may already have been determined for a specific landscape position zone and the database may simply correlate optimal ground pressure values with field locations.

An embodiment of the present invention also provides a technique to enhance vehicle stability and control. Traction is the effective conversion of rotary axle power to linear vehicle power (a.k.a. drawbar power). At 100% tractive efficiency, there is no wheel slip. At 0% tractive efficiency, there is no linear movement of the vehicle even though the drive wheels are spinning. Stability refers to the vehicle not rotating in any of the three axes (pitch, roll, and yaw) that would otherwise result in flipping, tipping or spinning of a vehicle. In this embodiment, vehicle stability and control are managed using a virtual foot which can rapidly change its footprint. A broader footprint is created when greater stability or traction is needed, and a smaller footprint is created at other times in order to decrease fuel consumption and decrease soil damage. The virtual foot, or v-foot, encompasses that part of a vehicle or mobile machine which makes contact with the ground for tractive effort and support, and includes without limitation wheels, tracks, track wheels, inflatable tires, tires with shape adjustment using magneto-rheological or electro-rheological materials, wheels which change footprint by getting wider or narrower, vehicles in which wheels may be raised or lowered to change vehicle footprint, legs, etc.

"Footprint" is defined not only as the pressure exerted by an individual V-foot on a surface by a vehicle, but also includes management of relative pressures, contact area, friction, etc. for the following without limitation:

1. Two or more V-feet and a single machine, e.g. a tractor, combine or other agriculture harvester, loader, mower, timber harvester, on-road car or truck.
2. One or more V-feet of a vehicle with at least one driven V-foot towing or pushing one or more trailers, implements, etc. (mechanical linkage) each having at least one v-foot, e.g., tractor-implement, on road tractor-trailer, tractor-scraper, etc.
3. One or more V-feet of a first vehicle and on a second vehicle (or more) wherein at least one V-foot on each vehicle is powered. The first vehicle and the second vehicle are mechanically coupled to provide additive traction effort.
4. One or more V-feet of a first vehicle and on a second vehicle wherein a load is carried in a coordinated fashion by the two (or more) vehicles.

Figure 5:
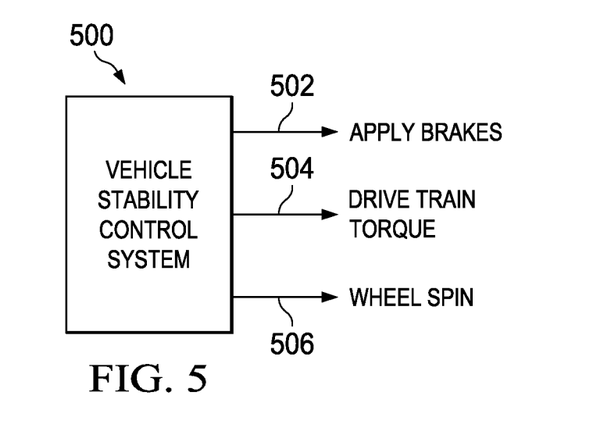
FIG. 5 is a representative traditional vehicle traction and stability control system.

FIG. 5 depicts at 500 a traditional vehicle traction and stability control system that includes applying brakes at 502, adjusting drive train torque at 504, and controlling wheel rotation or spin control at 506.

Figure 6:
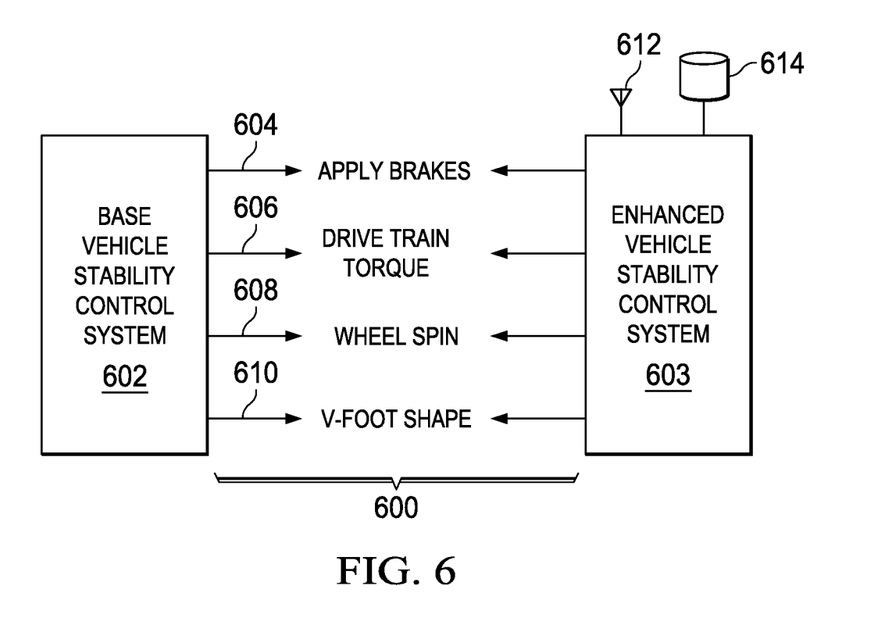
FIG. 6 is a representative improved vehicle traction and stability control system in accordance with an illustrative embodiment.

An improved vehicle traction and stability control system is depicted at 600 in FIG. 6 and includes base system 602 and enhanced system 603. Base system 602 includes applying brakes at 604, adjusting drive train torque at 606, controlling wheel rotation or spin control at 608, and changing v-foot shape at 610. While prior techniques of slowly adjusting air pressure in all tires for wheel slip control, per the features provided herein both wheel slip and vehicle stability are provided by quickly adjusting the shape of individual v-foot elements, such as on a wheel-by-wheel basis. In a round wheel/tire, this is accomplished without limitation using polymers, magneto-rheological materials, or electro-rheological materials which can change stiffness, volume, or other useful property in response to a control signal. An example of one such wheel is disclosed in published US Patent Application 20100314015A1 entitled "Magneto-Rheological Elastomer Wheel Assemblies with Dynamic Tire Pressure Control", which is hereby incorporated by reference as background material. A wheel assembly includes a magneto-rheological elastomer (MRE) assembly disposed between a rim and a tire assembly. The MRE assembly may be configured to adjust a tire pressure within a chamber between the rim and the tire assembly when a magnetic field is applied to the MRE assembly.

Continuing with FIG. 6, there is also shown at 603 an enhancement to the vehicle traction and stability system. While a traditional traction and stability control system such as shown at 602 uses local sensed data only, the enhanced vehicle traction and stability system at 603 uses real-time data provided by wireless interface 612, historical data as provided by storage device 614, and/or predicted data to optimally manage the v-foot print. The use of this supplemental has several potential benefits. For example, if there is a significant latency between on-board sensing and an adequate response by the v-foot, an advanced notice of where the footprint needs to be changed enables the change to be made prior to encountering the surface condition which requires it. In addition, if there is an area of frequently changing conditions, such as patchy ice, the footprint can be enlarged and kept large until the patchy area is passed-over. This reduces wear on the system and minimizes discomfort for any vehicle passenger due to the v-foot changes.

Wireless interface 612 is preferably a short-range Wi-Fi network based on 802.11, although other types of communication interfaces are possible such as a wide-range cellular or satellite network. Such interface provides vehicle-to-vehicle communications for vehicles on the same worksite or vehicles passing in opposite directions on a road/highway, where data is exchanged regarding footprint information, slip information, stability information, etc. that is tagged with time and location metadata. Use of a wide-range network allows communicating data with a remote data center/complex in order to receive information for a road ahead or a worksite area about to be entered. In some situations it is advantage to provide interfaces to both short-range and long-range networks such that locally acquired data using a short-range network can be provided to a remote data center using a long-range network, as further described below with respect to fleet-processing.

The historic data in storage device 614 may be data from earlier passes of the vehicle in the same location, or may be with respect to nearby areas such as adjacent passes in a field. Historic data may be relatively recent or may be from similar situations in the more distant past. In that case, a predictive algorithm is used to predict the optimal v-foot footprint for current conditions based on performance in similar conditions in the remote past.

Figure 7A:
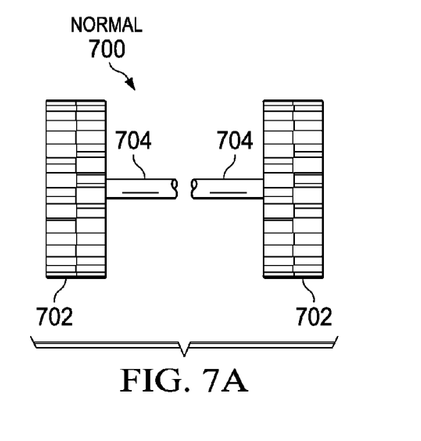
FIGS. 7A-7C are representations of a normal and modified v-foot in accordance with an illustrative embodiment.
Figure 7B:
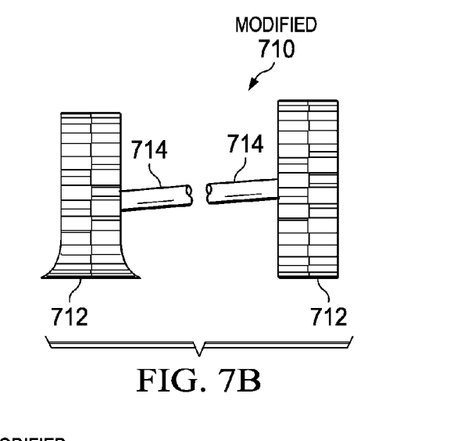
Figure 7C:
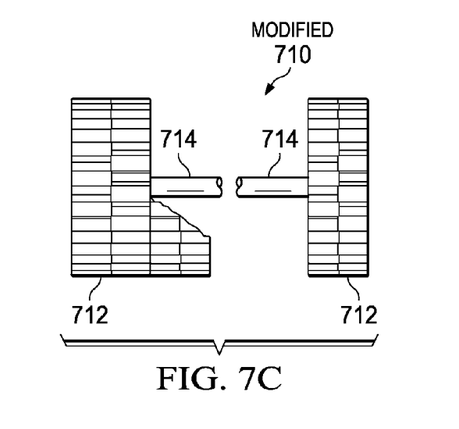

Turning now to FIG. 7A there is shown at 700 two wheels 702 connected by single axle 704 of a two-axle, four-wheel vehicle. Wheels 702 are in a normal operating state. In FIG. 7B and FIG. 7C there is shown at 710 examples of a response to a detected slip to the left. Here there is also depicted two wheels 712 connected by single axis 714. In response to such detected left-slip, the footprint of the left v-foot is increased in order to increase resistance to the slipping. If this detecting slippage problem was with respect to a front wheel drive on-road vehicle, the footprint of both the front wheels would preferably be increased while the rear wheels are left unchanged.

Techniques for detecting wheel slip and vehicle slide are commonly known, and are augmented by the following control mechanism:

10 Begin
20 Get vehicle stability and traction data
30 IF problem=no THEN footprint→normal GOTO 20
40 IF problem=traction THEN
50 increase footprint of driven v-feet
60 ENDIF
70 IF problem=sliding left THEN
80 increase footprint of left v-feet
90 ENDIF
100 IF problem=sliding right THEN
110 increase footprint of right v-feet
120 ENDIF
130 GOTO 20

An embodiment of the present invention also provides a technique for increasing fuel efficiency of a work machine by varying traction as needed. Traction is varied by changing the footprint of a virtual-foot, or v-foot. Increased traction may be demanded in response to vertical or horizontal load, current or future segment of a cyclic task external perception sensor, or other mechanism.

Figure 8:
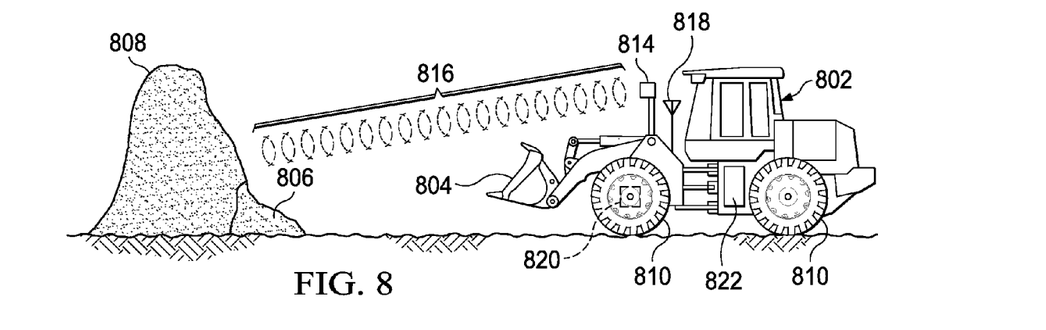
FIG. 8 is a representative side view of a worksite in accordance with an illustrative embodiment.
Figure 9:
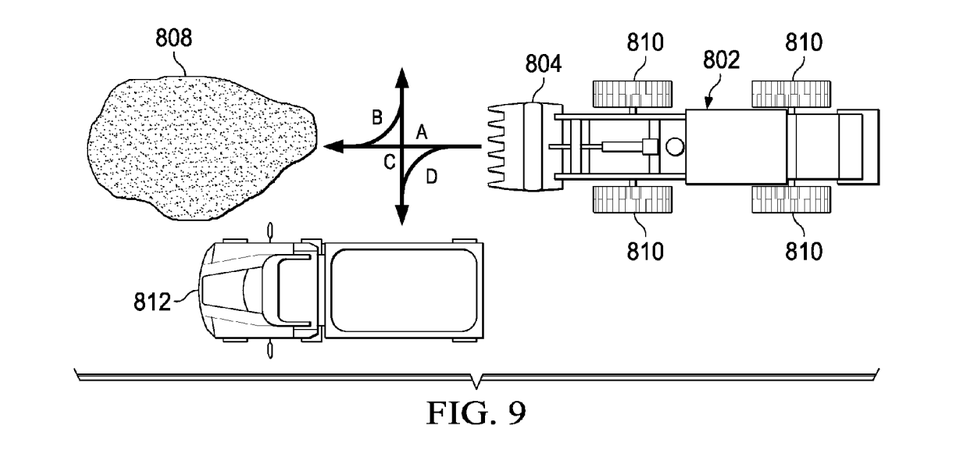
FIG. 9 is a representative top view of a worksite in accordance with an illustrative embodiment.

FIG. 8 (side view) and FIG. 9 (top view) show a worksite in which front end loader 802 with bucket 804 is to fill bucket 804 with material 806 from pile of material 808. Front end loader 802, in this particular example, has wheels 810 whose footprint can be adjusted via a magneto-rheological material. Material 806 is to be deposited in waiting truck 812 (FIG. 9). To carry out this task, front end loader 802 has a cyclic pattern A, B, C and D comprising (as further depicted in FIG. 9):

A—Drive forward into the material pile
B—Back-up and turn
C—Drive towards truck and dump material
D—Back-up to reposition relative to pile for next cycle The main need for traction in this representative example is at the end of path segment A as front end loader 802 drives into pile of material 808. The wheel footprint can be increased just before/as the bucket engages the pile for maximum traction. There are a number of ways the loader can know when it is time to change wheel footprint to increase traction or decrease fuel use. Examples include, without limitation, a processor which can control the footprint of wheels 810 using additional means such as:

1. Bucket 804 is lowered and ranging sensor 814 with emissions/reflections 816 from pile of material 808 indicates contact is imminent and traction should be increased.
2. GNSS or GPS sensor 818 reports the position between front end loader 802 and pile of material 808 is decreasing and traction should be increased.
3. Bidirectional odometer 820 and engine load sensor 822 allow segments of path A, B, C, D to be inferred. The traction can be increased when the end of segment A is identified.
4. Worksite map with traction needs and index with GNSS position from sensor 818 would indicate target traction needs.

Figure 10:
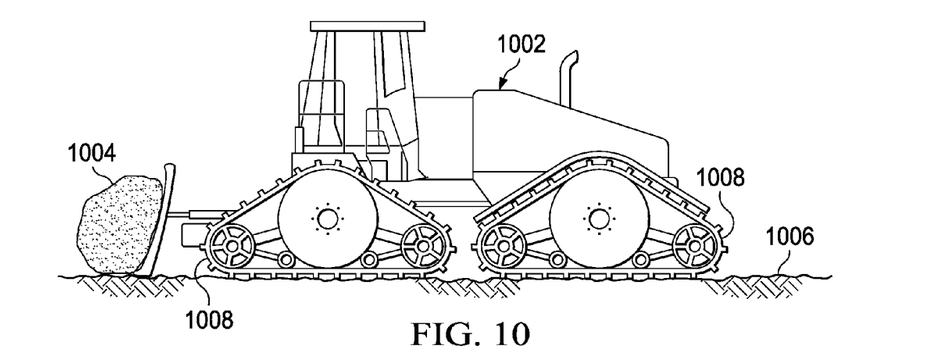
FIG. 10 is a representative high speed bull dozer pushing material across the ground in accordance with an illustrative embodiment.

FIG. 10 shows high speed (bull) dozer (HSD) 1002 pushing material 1004 across ground 1006. High speed dozer 1002 has wheel tracks 1008 which are normally shaped as wheels but can extend to a track as shown to increase traction when needed. In this example, tracks may be extended when horizontal material load is high and then retracted when there is no horizontal load and HSD is moving between points on the worksite.

If high speed dozer 1002 of FIG. 10 had inflatable tires or wheels adjustable with magneto-rheological materials, a blade control system (not shown but known in the art) would manage the blade and material placement as the body of the vehicle changed with v-foot shape change. V-foot shape may change gradually as material 1004 is distributed along ground 1006 and the horizontal load decreases.

Preferably, a tire profile is dynamically adjusted based on a largely horizontal load in order to optimize traction and fuel economy. For example, a dozer or grader may initially start out with a large amount of material against the blade. The material is to be spread according to a particular plan. As the material is spread, the load being pushed is reduced and therefore less traction is needed. As the load is reduced, the Galileo wheel (as previously described) is rounded to improve fuel efficiency. Since the vehicle height is raised as the wheel is rounded, automatic blade control is required to keep material spreading to plan. While the blade control system could operate without wheel data, wheel data can improve control if used as an input parameter, particularly if wheel rounding is rapid. The wheel shape is adjusted based on external in situ conditions such as surface material, soil moisture, and the like. Internal data common to vehicle traction control systems could also be used, such as grain in hopper, logs in a timber forwarder, water in a sprayer, chemical on a service robot, etc.

Some worksites such as farm fields, lawns, and forest floors can be damaged by soil compaction if vehicles exert high pressure on the soil. Tire pressure can be reduced while the vehicle is in the worksite, but reduced pressure in areas where it is not needed can result in unnecessary fuel consumption. Furthermore, some work contracts or government regulations may require that such damage be minimized. What is needed is a way to minimize soil compaction damage, minimize fuel consumption, and document that vehicles have not caused excessive soil compaction or document where compaction may have occurred to enable remedial tillage to only those affected areas.

Accordingly, an embodiment of the present invention also provides a technique to document that vehicles have not caused excessive soil compaction, which can be used in one situation to document compliance with work restrictions that may be in place at a given worksite. A soil compaction susceptibility map is generated and optionally modified with in situ data which minimizes soil compaction/damage through both vehicle guidance and virtual-foot, or v-foot, footprint measurement.

Figure 11:
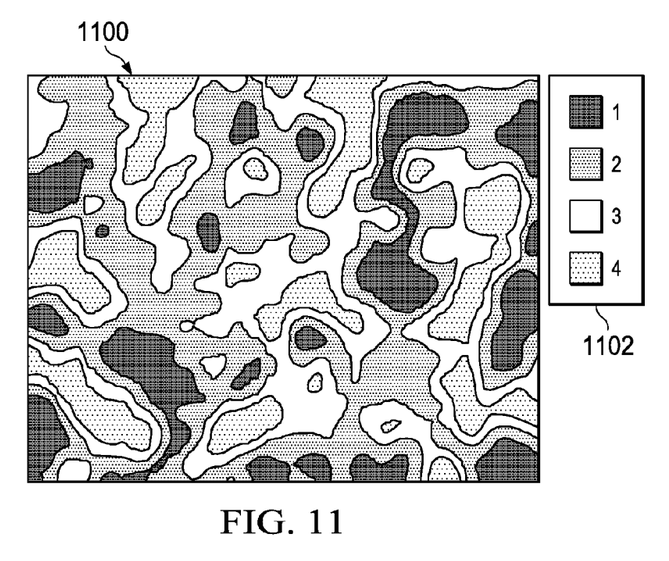
FIG. 11 is a representative soil compaction susceptibility map in accordance with an illustrative embodiment.

A representative susceptibility map is shown at 1100 in FIG. 11, where zone 1 is the most susceptible region and zone 4 is the least susceptible region as per reference key 1102. A path of travel for a vehicle is generated using the generated map. The path actually taken as well as real-time v-foot parameters such as tire pressure, footprint size, etc. are recorded for subsequent record keeping and analysis.

Figure 12:
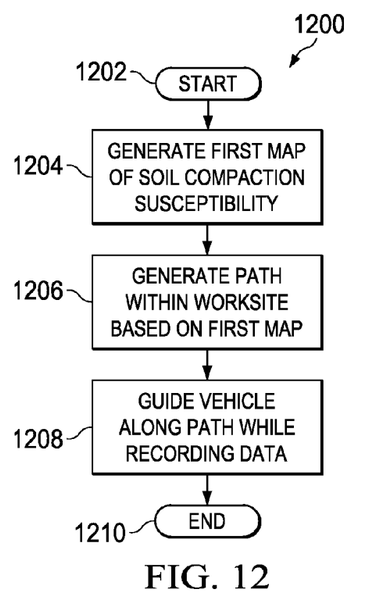
FIG. 12 is a representative recording process in accordance with an illustrative embodiment.

Specifically, and referring to recording process 1200 depicted in FIG. 12, processing begins at 1202 and continues to 1204 where a first map of soil compaction susceptibility for all or part of a worksite is generated based on landscape position, soil type, and soil moisture. In one embodiment, soil (moisture) models are used to provide data for a priori path planning for a mobile machine with variable tire pressure, with the a priori plan being updated with actual in situ data that is captured while performing work at the worksite.

At step 1206, a path within the worksite is generated based on the first map which minimizes soil compaction while carrying out a mission such as plowing or mowing. Such path generation is preferably performed using area coverage in accordance with the techniques described in published U.S. Patent Application 2007/0239472 entitled "Vehicle Area Coverage Path Planning Using Isometric Value Regions", which is hereby incorporated by reference as background material. Alternatively, a point-to-point path could be generated using known techniques such as those described in U.S. Pat. Nos. 6,934,615; 7,079,943; 7,110,881; and 7,505,848, which are hereby incorporated by reference as back ground material.

At step 1208, a vehicle is guided along the generated path, while recording (i) the geo-referenced and time stamped path, slip, etc., and (ii) the v-foot pressure/footprint that was actually used when traversing the path as per the v-foot management techniques described hereinabove. The recorded data is then transferred to a remote location, as previously described above in the fleet-processing description. Processing ends at 1210.

In another embodiment, the vehicle is guided along the path while reducing v-foot pressure as the vehicle proceeds along the path. This supports a mode where a tire, for example, enters a worksite maximally inflated, and then only releases air through a controlled value as it passes through the worksite. The tire can be re-inflated from a conventional compressor prior to road transport. This scenario may be useful when there is no source of air for refilling tires on-the-go at the worksite such as a central tire inflation system.

In yet another embodiment, at least one datum about soil compaction susceptibility at a particular location in the field is obtained. A second map of soil conception susceptibility of all or part of a worksite is generated using the data of the first map and the in situ gathered data. This susceptibility map is adjusted generally along topology and/or landscape position, and the vehicle is guided along the path. Similar data recording as described above is performed during such vehicle path guidance.

Figure 13:
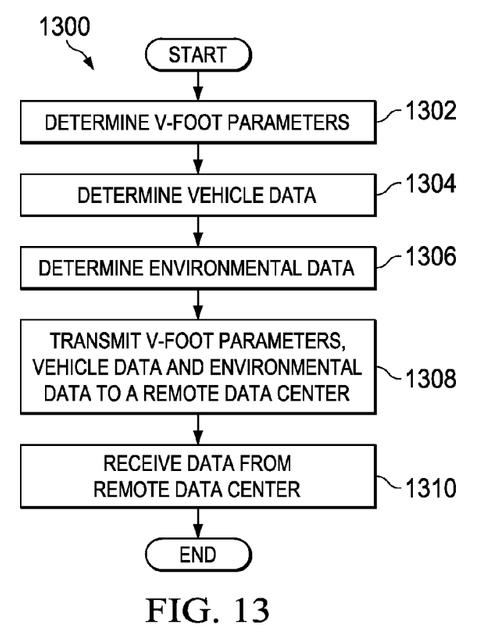
FIG. 13 is a representative process flow for managing a fleet of vehicles using v-foot management.

As shown by 1300 in FIG. 13, an embodiment of the present invention also provides a technique for managing a fleet of vehicles in order to reduce downtime due to tire failures, where v-foot management is used. Data pertaining to v-foot, a vehicle, an environment and other data are collected and used to either generate an alert to perform a tire replacement, deny a mission to be performed by a given one or more vehicles, change a tire parameter at a service station or in situ, or change operation of one or more vehicles.

In this embodiment, a v-foot is preferably instrumented to include tire pressure and temperature sensors, with data relating thereto being wirelessly transmitted to a receiver on the vehicle. An instrumented v-foot on a vehicle such as element 100 of FIG. 1 sends data to a telematics unit (such as element 134 of FIG. 2 and element 612 of FIG. 6) on the vehicle. The telematics unit associates the v-foot data determined at step 1302 with additional vehicle data determined at step 1304 and/or additional environmental data determined at step 1306. Additional vehicle data may include without limitation, current date and time, a vehicle load (e.g., grain in a hopper, logs on a timber forwarder, water in a sprayer, chemical on a service robot, etc.), a vehicle location, a vehicle speed, a vehicle fuel consumption, etc. Additional environmental data may include without limitation ambient air temperature, ground/road surface temperature, and ground/road texture (e.g., gravel, asphalt, grass, etc.).

The vehicle may communicate bi-directionally with a data processing center. The communication may be via long range wireless, short range wireless to an internet access point at a service station, or a portable data storage device such as a thumb-drive, for example. In one illustrative embodiment, v-foot, vehicle, and environmental data is sent to a remote data processing center for analysis at step 1308, with the results or other information being sent back to the vehicle at step 1310.

In another illustrative embodiment, rules, a case base, environmental data, or other knowledge base is sent to the vehicle or updated at the vehicle such that analysis is performed at the vehicle.

In some embodiments, data values may be inferred or calculated from raw data. In one exemplary case, the current vehicle location is used as an index into one or more maps which contain road surface information such as gravel, asphalt, snow covered, wet, etc., as previously shown.

A fleet is considered two or more vehicles having v-feet. In one illustrative embodiment, the vehicles are trucks and the v-feet are inflatable tires. Tire/v-foot data includes pressure and temperature. Vehicle data includes vehicle location and vehicle speed. Environmental data includes road surface and ambient temperature. V-foot data, vehicle data and environmental data are sent to data center. One or more tire condition data are calculated at the data center. The data center may also have access to other vehicle data including without limitation future missions, weather, and v-foot maintenance data. In this scenario, the data center is responsible for vehicle deployment and vehicle maintenance. The data center may calculate one or more tire health parameters including, without limitation, estimated tread, v-foot foot print, future pressure, etc.

In one sub-embodiment, estimated tread depth and weather information are used to assign a particular truck to a mission as described in U.S. Pat. No. 7,415,333 which is hereby incorporated by reference as background material. For example, a truck having tires with low tread depth may not be assigned missions where heavy rain or snow are forecast, where the road surface is snowy and elevation change is significant, etc.

In a second exemplary sub-embodiment, tires are prioritized for replacement. When a truck reaches a service station, it may be flagged for tire replacement as part of scheduled maintenance.

In a third exemplary sub-embodiment, ambient temperature and road conditions may cause the driver to be alerted to adjust tire pressure for the next segment of a trip when at a service station. For example, tire pressure may be increased prior to traveling in a colder region, reduced before traveling in a hot or poor traction region, etc. If a tire condition develops between service stops, the driver may be advised to limit speed to reduce tire temperature or increase tire life.

In a fourth exemplary embodiment, the data center is able to infer an event such as pothole or loss of traction at an intersection. This data may be transmitted from data center to another party. The another party may be, for example without limitation, a street department, a department of transportation, an insurance company, a research department, etc.

In a fifth exemplary embodiment, a v-foot is cycled through a shape, pressure, or size change in order to expel a foreign material (e.g., snow, ice, mud, rock) or to reseat or otherwise bring the v-foot to a given state, to recalibrate sensors, or to otherwise enhance the performance of the v-foot. For example, the condition of the wheel can be used as parameter for the previously described control algorithm such that wear on the wheel is always considered. When trend of deterioration is detected, control parameters can be adjusted to maintain a level of performance or to extend life until maintenance can be performed.

The description of the different advantageous embodiments has been presented for purposes of illustration and description, and is not intended to be exhaustive or limited to the embodiments in the form disclosed. Many modifications and variations will be apparent to those of ordinary skill in the art. For example, while the present disclosure is primarily geared toward an agriculture environment, the techniques described herein are also applicable in construction, forestry and turf environments. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for managing pressure of a vehicle against a surface, comprising steps of:
    sensing a vehicle location of the vehicle;
    determining a landscape position based on the vehicle location;
    determining a vehicle mass of the vehicle using at least one of a value received wirelessly from an off-board location and a calculated value from a volume measurement; and
    adjusting the pressure of the vehicle against the surface based on the landscape position and the vehicle mass of the vehicle.

2. The method of claim 1, wherein the vehicle location is sensed using a geographic positioning satellite (GPS) system.

3. The method of claim 1, wherein the landscape position is determined using topographical information pertaining to a work area of the vehicle.

4. The method of claim 3, wherein the topographical information is stored in a geographic information system (GIS) database that comprises representative types of surface characteristics including soil density, moisture content and slope.

5. The method of claim 1, wherein the vehicle location serves as an index into a landscape position zone for a work area of the vehicle.

6. The method of claim 1, wherein adjusting the pressure of the vehicle against the surface comprises at least one of changing a tire pressure, changing a shape of a ground contacting element, and changing a number of ground contacting elements contacting the surface.

7. The method of claim 1, wherein adjusting the pressure of the vehicle against the surface comprises changing a shape of a ground contacting element that comprises at least one of magneto-rheological and electro-rheological materials.

8. The method of claim 1, wherein the surface is at least one of: ground, soil, snow, ice or a floor.

9. A surface pressure management system configured to manage pressure of a vehicle against a surface comprising a data processor coupled to a memory comprising instructions for performing steps of:
    sensing a vehicle location of the vehicle;
    determining a landscape position based on the vehicle location;
    determining a vehicle mass of the vehicle, wherein determining the vehicle mass of the vehicle comprises using at least one of a value received wirelessly from an off-board location and a calculated value from a volume measurement to determine the vehicle mass of the vehicle; and
    adjusting the pressure of the vehicle against the surface based on the landscape position and the vehicle mass of the vehicle.

10. The surface pressure management system of claim 9, wherein the vehicle location is sensed using a geographic positioning satellite (GPS) system.

11. The surface pressure management system of claim 9, wherein the landscape position is determined using topographical information pertaining to a work area of the vehicle.

12. The surface pressure management system of claim 9, wherein the topographical information is stored in a geographic information system (GIS) database that comprises representative types of surface characteristics including soil density, moisture content and slope.

13. The surface pressure management system of claim 9, wherein the vehicle location serves as an index into a landscape position zone for a work area of the vehicle.

14. The surface pressure management system of claim 9, wherein adjusting the pressure of the vehicle against the surface comprises at least one of changing a tire pressure, change a shape of a ground contacting element, and changing a number of ground contacting elements contacting the surface.

15. The surface pressure management system of claim 9, wherein adjusting the pressure of the vehicle against the surface comprises changing a shape of a ground contacting element that comprises at least one of magneto-rheological and electro-rheological materials.

16. The surface pressure management system of claim 9, wherein the surface is at least one of: ground, soil, snow, ice or a floor.

* * * * *